(No Model.) 2 Sheets—Sheet 2.
H. A. WAHLERT
LOCOMOTIVE BRAKE.
No. 347,407. Patented Aug. 17, 1886.
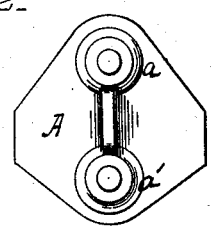
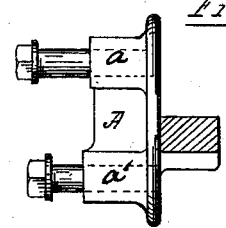
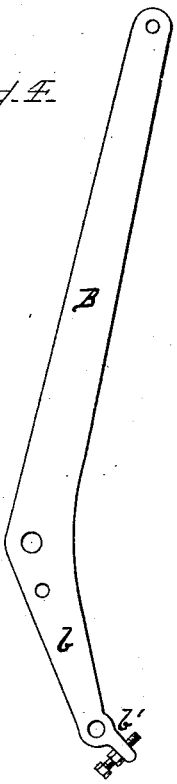
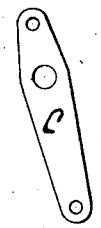
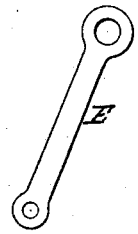
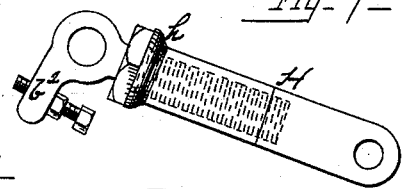
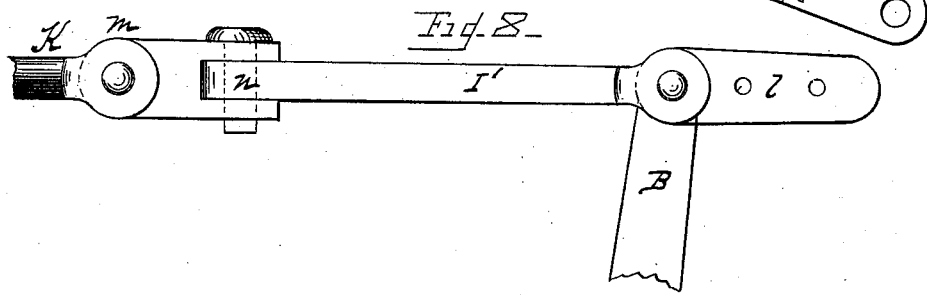
Witnesses
G. A. Tauberschmidt
F. P. Metzger
Inventor
Henry A. Wahlert
by F. W. Ritter, Jr.
Atty

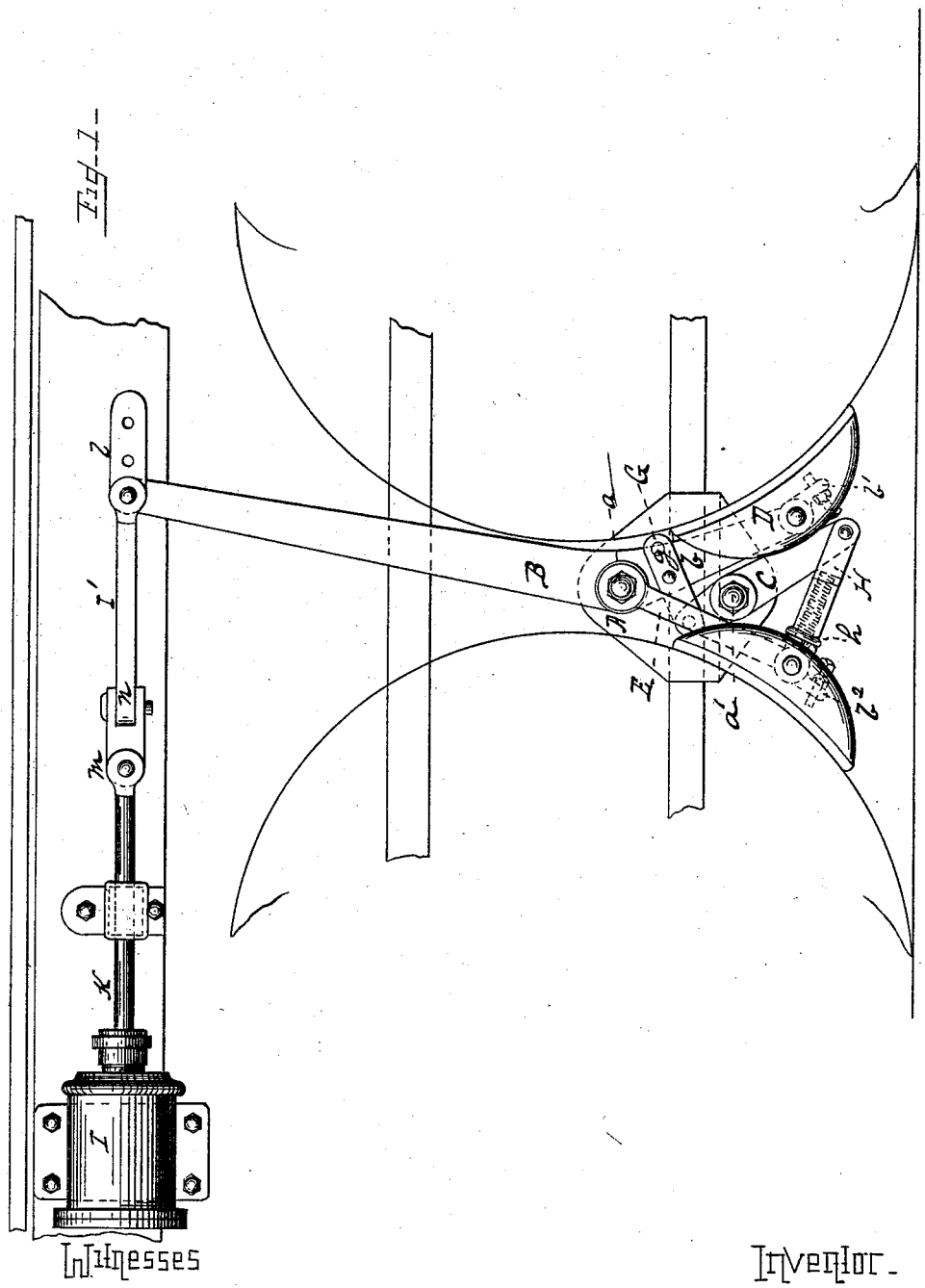

UNITED STATES PATENT OFFICE.

HENRY A. WAHLERT, OF ST. LOUIS, MISSOURI, ASSIGNOR TO THE AMERICAN BRAKE COMPANY, OF SAME PLACE.

LOCOMOTIVE-BRAKE.

SPECIFICATION forming part of Letters Patent No. 347,407, dated August 17, 1886.

Application filed January 20, 1886. Serial No. 189,190. (No model.)

*To all whom it may concern:*

Be it known that I, HENRY A. WAHLERT, a citizen of the United States, residing at St. Louis, in the State of Missouri, have invented certain new and useful Improvements in Locomotive-Brakes; and I hereby declare the following to be a full, clear, and exact description of the same, reference being had to the accompanying drawings, wherein—

Figure 1 is a side elevation of the brake mechanism and so much of the wheels, truck, and boiler as will serve to illustrate the attachment and relative position of the brakes, boiler, truck, &c.; Figs. 2 and 3, elevation and edge views of the face-plate or bracket which supports the brake-levers; Fig. 4, a detached view of main or power lever. Fig. 5 is a detached view of the supplemental or second lever. Fig. 6 is a detached view of the hanger. Fig. 7 is a detached view of the adjustable push-bar. Fig. 8 is an enlarged view of the end of the piston, the knuckle-joint, and the lever or link which connects the piston-rod with the main lever of the brake mechanism.

Like letters refer to like parts wherever they occur.

My present invention relates to the construction of a system of leverage for operating locomotive-brakes located between the drivers, and to the connections of the same with the piston of the cylinder by which the brakes are operated.

There are two conditions or constructions frequently met with in locomotives which render it more or less troublesome to apply or adapt brakes to the locomotives. The first of these conditions or constructions is the "bogie" engine, or that class where the drivers have a movement independent of the boiler, to which, so far as I am aware, none of the present forms is applicable, as none can be so arranged as to be operative and yet permit the free movement of the truck; and the second condition arises from the smallness of space between the driving-wheels or close-coupled drivers, and to such engines but few of the present systems of locomotive-brakes are capable of being adapted. These conditions—viz., the pivoted truck and the close-coupled drivers—both exist in bogie-engines; therefore the present invention, though of general utility on any locomotive, is specially intended to meet the wants of bogie-engines.

The first feature of the present invention consists in supporting the brake-cylinder on the boiler and connecting the piston thereof with the power-lever of the brake system by a knuckle or double-pivot joint, which permits of the movement of the brake-levers with the truck without disturbing the relations of said levers to the source of power.

The second feature of the invention consists in combining with the main power-lever, which carries one of the brake-heads of a supplemental or secondary power-lever, a link and a push-bar to operate the other head, so that the brake-heads are applied simultaneously and with equal power to both driving-wheels.

I will now proceed to describe my invention more specifically, so that others skilled in the art to which it appertains may apply the same.

In the drawings, A indicates a face-plate adapted to be secured to the frame of a locomotive, or to a suitable part of the truck of a bogie-engine, between the drivers, said face-plate provided with two bosses, $a$ $a'$, one below the other, having fulcrum-bolts for the brake-levers.

The brake-levers, which are two or more in number, consist of a power-lever, B, which is pivoted on the bolt $a$ of the face-plate, and an auxiliary or supplemental lever, C, which is pivoted on the lower of the two bolts $a'$. The main power-lever B has its lower or short arm, $b$, curved or bent toward one of the drivers, and terminates in a projection, $b'$, through which passes the adjusting-screw of one brake-head. To this short arm $b$ one of the brake-heads D is attached. The other of the brake-heads D is suspended from the bolt $a$, or fulcrum of the main power-lever B, by a suitable hanger, E. The auxiliary or supplemental lever C, which is pivoted on the lower fulcrum-bolt, $a'$, is arranged parallel with the bent or curved arm $b$ of the main power-lever, and has its upper or short arm connected with the main power-lever, below the fulcrum thereof, by means of an adjustable link, G, and its lower or long arm with the brake-head, which is supported by the hanger or second brake-head, by means of an adjustable push-bar, H. The adjustable link G is preferably a short lever, having a series of holes, $g$, for adjusting its connection with the main power-lever B, and the adjustable push-bar is preferably one provided with the projection or toe and adjusting-screw $b^2$ and the screw-rod or turnbuckle $h$.

The position or relation of the fulcra $a\ a'$ to each other, and the relative lengths of short arm $b$ of the main power-lever B, the long and short arms of the auxiliary lever C, the link G, which connects the levers, and the push-bar H, are so that a toggle movement is obtained which will apply the power equally and move the brake-heads simultaneously through the same distances.

I indicates a horizontal cylinder for applying the power to the main brake-lever, said cylinder connected to or mounted on the boiler or frame at some convenient place, and having a piston, K, which is connected to the main power-lever B by a link or rod, I', having an adjustable connection, as at $l$, and a vertical and horizontal or double knuckle-joint, $m\ n$. This connection between the power-lever and the piston permits the free movement of the brakes with the pivoted truck of the driving-wheels, while the cylinder remains fixed on the boiler.

It is evident that another form of brake-lever system might be substituted for that shown and be effectively operated from the cylinder by the double knuckle-joint connection; but it will be found that the brake-lever system herein described is by far the best for use between all closely-connected drivers.

Having thus described my invention, its operation and advantages, what I claim, and desire to secure by Letters Patent, is—

1. In a locomotive-brake, the combination, with the power-piston and the power-lever of a brake system, of an interposed double knuckle-joint for a vertical and a horizontal pivotal connection, substantially as and for the purposes specified.

2. The combination, with the main power-lever having a bent or curved arm for supporting one brake-head, of a hanger for sustaining the other brake-head, an auxiliary lever connected with the main power-lever, and suspended brake-shoe, substantially as and for the purposes specified.

3. In a locomotive-brake, the combination of a curved main lever, an auxiliary lever having its fulcrum below that of the main lever and arranged parallel with the short arm of the main lever, a link which connects one end of the auxiliary lever with the main lever, and a push-bar which connects the suspended shoe with the other arm of the auxiliary lever, substantially as and for the purposes specified.

In testimony whereof I affix my signature, in presence of two witnesses, this 2d day of January, 1886.

HENRY A. WAHLERT.

Witnesses:
GEORGE H. POOR,
E. B. LEIGH.